United States Patent
Kim et al.

(10) Patent No.: US 9,621,301 B1
(45) Date of Patent: Apr. 11, 2017

(54) SYSTEMS AND METHODS FOR DETERMINING A MODULATION AND CODING SCHEME FOR A SMALL CELL

(71) Applicant: Sprint Spectrum LP, Overland Park, KS (US)

(72) Inventors: Yun Sung Kim, Ashburn, VA (US); Sanghoon Sung, Ashburn, VA (US); Pinal Tailor, Ashburn, VA (US); Tri Duong, Annandale, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 139 days.

(21) Appl. No.: 14/567,237

(22) Filed: Dec. 11, 2014

(51) Int. Cl.
*H04L 1/00* (2006.01)
*H04W 24/08* (2009.01)

(52) U.S. Cl.
CPC ........... *H04L 1/0003* (2013.01); *H04W 24/08* (2013.01)

(58) Field of Classification Search
CPC ... H04L 5/0053; H04L 5/0035; H04L 5/0073; H04W 24/10; H04W 72/082; H04W 52/243
See application file for complete search history.

(56) References Cited

U.S. PATENT DOCUMENTS

| | | | |
|---|---|---|---|
| 2012/0113844 A1* | 5/2012 | Krishnamurthy | H04L 1/0026 370/252 |
| 2013/0203398 A1* | 8/2013 | Callard | H04W 88/08 455/418 |
| 2014/0198678 A1 | 7/2014 | Kim et al. | |
| 2015/0085767 A1* | 3/2015 | Einhaus | H04L 1/0001 370/329 |
| 2015/0103683 A1* | 4/2015 | Kim | H04W 24/02 370/252 |
| 2015/0110024 A1* | 4/2015 | Manssour | H04W 72/1273 370/329 |

* cited by examiner

*Primary Examiner* — Jung Park

(57) ABSTRACT

Systems and methods are described for determining a modulation and coding scheme for a small cell. A small cell may receive a first signal level for a first signal received at a wireless device and a second signal level for a second signal received at the wireless device, wherein the received first signal is from the small cell and the received second signal is from a macro cell. The small cell may also receive a channel quality indicator from the wireless device that indicates a channel quality for communications between the wireless device and the small cell. A signal level metric may be calculated based on the first signal level, the second signal level, and the received channel quality indicator. A modulation and coding scheme for a transmission from the small call may be determined, wherein the transmission is associated with an almost blank subframe transmission from the macro cell.

20 Claims, 7 Drawing Sheets

SYSTEMS AND METHODS FOR DETERMINING A MODULATION AND CODING SCHEME FOR A SMALL CELL

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a portion of the network may experience high load (e.g., load above a threshold). For example, a communication link may experience large amount of data traffic. Here, the efficiency of the system may suffer due to excessive load on a portion of the system. Accordingly, a system that effectively balances load and distributes traffic throughout the system may be able to provide a high quality service to users of the system.

OVERVIEW

Systems and methods are described for determining a modulation and coding scheme for a small cell. A small cell may receive a first signal level for a first signal received at a wireless device and a second signal level for a second signal received at the wireless device, wherein the received first signal is from the small cell and the received second signal is from a macro cell. The small cell may also receive a channel quality indicator from the wireless device that indicates a channel quality for communications between the wireless device and the small cell. A signal level metric may be calculated based on the first signal level, the second signal level, and the received channel quality indicator. A modulation and coding scheme for a transmission from the small call may be determined, wherein the transmission is associated with an almost blank subframe transmission from the macro cell.

DETAILED DESCRIPTION

Figure 1:
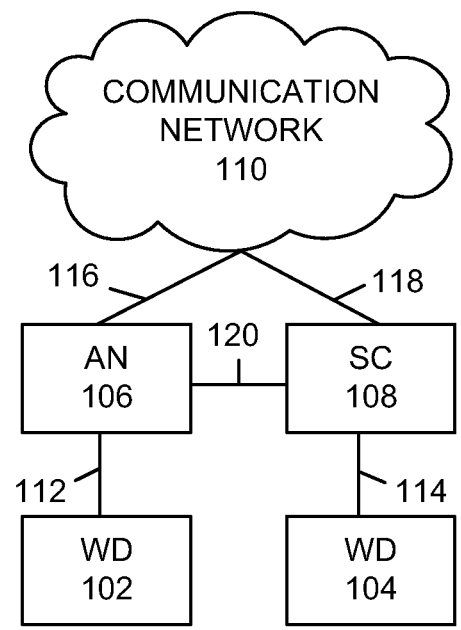
FIG. 1 illustrates an exemplary communication system to determine a modulation and coding scheme for a small cell.

FIG. 1 illustrates an exemplary communication system 100 to determine a modulation and coding scheme for a small cell comprising wireless devices 102 and 104, access node 106, small cell 108, communication network 110, and communication links 112, 114, 116, 118, and 120. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 106, small cell 108, and communication network 110 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access node 106 and small cell 108, any number of wireless devices can be implemented.

Access node 106 and small cell 108 are network nodes capable of providing wireless communications to wireless devices 102 and 104. Access node 106 can be, for example, a base transceiver station, a radio base station, an eNodeB device, or an enhanced eNodeB device. In an embodiment, access node 106 may comprise a macro cell while small cell 108 may comprise a small cell (e.g., femto cell, pico cell, micro cell, or the like) such that the signal area (e.g., area around each node where a wireless device may detect wireless signals transmitted from the node at a signal level above a threshold) for the macro cell is larger than the signal area for the small cell. As such, a macro cell may transmit wireless signals with a greater signal level (e.g., use a higher transmission power) than a small cell. Access node 106 and small cell 108 may communicate with communication network 110 over communication links 116 and 118 respectively. Access node 106 and small cell 108 may also communicate directly with each other over communication link 120.

Although only access node 106 and small cell 108 are illustrated in FIG. 1, wireless devices 102 and 104 can be in communication with a plurality of access nodes and/or small cells. The plurality of access nodes and/or small cells can be associated with different networks and can support different communication protocols and radio access technologies.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise a wireless network, including base stations, wireless communication nodes, telephony switches, internet routers, network gateways, computer systems, communication links, or some other type of communication equipment, and combinations thereof.

Communication links 112, 114, 116, 118, and 120 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
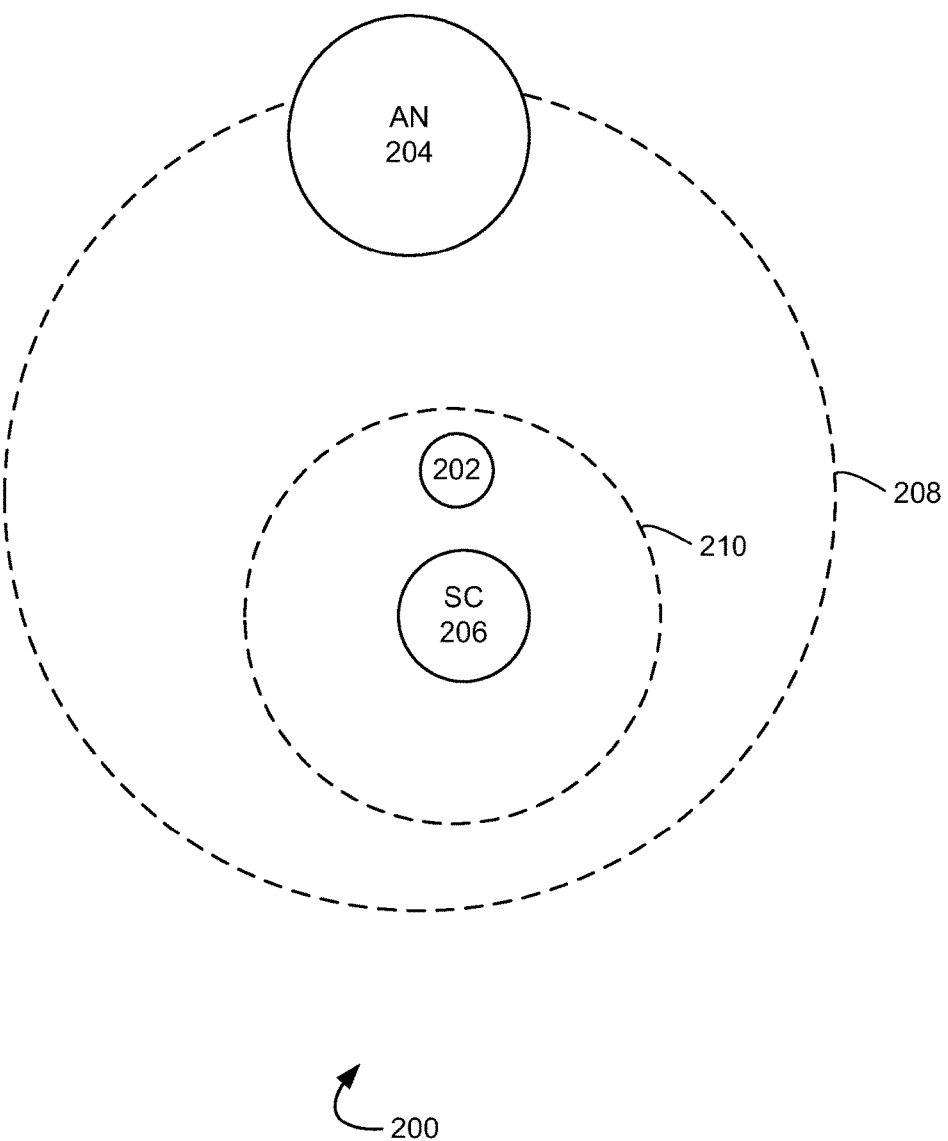
FIG. 2 illustrates another exemplary system to determine a modulation and coding scheme for a small cell.

FIG. 2 illustrates an exemplary communication system 200 for determining a modulation and coding scheme for a small cell. System 200 comprises wireless device 202, access node 204, small cell 206, and signal areas 208 and 210. Wireless device 202 may comprise a wireless device similar to wireless device 102. Access node 204 may comprise an access node similar to access node 106 and small cell 206 may comprise a small cell similar to small cell 108.

In operation, access node 204 and small cell 206 may establish communication with wireless devices such that the access node and small cell provide the wireless devices access to a communication network (e.g., communication network 110). In an embodiment, system 200 may use a plurality of carriers in order to provide wireless communication services. A plurality of carriers that comprise bandwidth for wireless communications (e.g., 2.5 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, access node 204 may comprise a macro cell and small cell 206 may comprise a small cell (e.g., femto cell, pico cell, micro cell, or the like). For instance, the signal area for the macro cell may be larger than the signal area for the small cell. In an embodiment, small cell 206 may communicate with access node 204 in order to communicate with a communication network (e.g., communication network 110).

For example, access node 204 may be in communication with a communication network (e.g., communication network 110) such that the communication network provides wireless services for wireless devices. The communication network may comprise a core network that includes, for example, a controller node, a gateway node, and any other suitable network elements. In an embodiment, small cell 206 may communicate with the communication network using access node 204. For example, small cell 206 may transmit data to access node 204 such that the transmitted data is used to enable one or more wireless devices to access an external network (e.g., the Internet) or to enable the one or more wireless devices to use services provided by the core network (e.g., voice services). In another embodiment, small cell 206 may directly communicate with the core network (e.g., without access node 204). For example, a backhaul for small cell 206 may connect to the core network and a communication network (e.g., communication network 110), using a wired or wireless communication link (e.g., not via access node 204).

In an embodiment, system 200 may leverage access node 204 and small cell 206 in order to provide wireless services over signal area 208. In some examples, small cell 206 may comprise a signal area 210 such that the small cell provides wireless services within signal area 208. Here, small cell 206 may be in communication with wireless device 202, and small cell 206 may configure transmissions from the small cell based on transmissions from access node 204. For example, small cell 206 may consider interference conditions caused by transmissions from access node 204 when determining a modulation and coding scheme. Accordingly, a system that determines a modulation and coding scheme for a small cell based on the transmissions from a macro cell may provide enhanced wireless services to users of the system.

Systems and methods are described for determining a modulation and coding scheme for a small cell. A small cell may receive a first signal level for a first signal received at a wireless device and a second signal level for a second signal received at the wireless device, wherein the received first signal is from the small cell and the received second signal is from a macro cell. The small cell may also receive a channel quality indicator from the wireless device that indicates a channel quality for communications between the wireless device and the small cell. A signal level metric may be calculated based on the first signal level, the second signal level, and the received channel quality indicator. A modulation and coding scheme for a transmission from the small call may be determined, wherein the transmission is associated with an almost blank subframe transmission from the macro cell.

Figure 3:
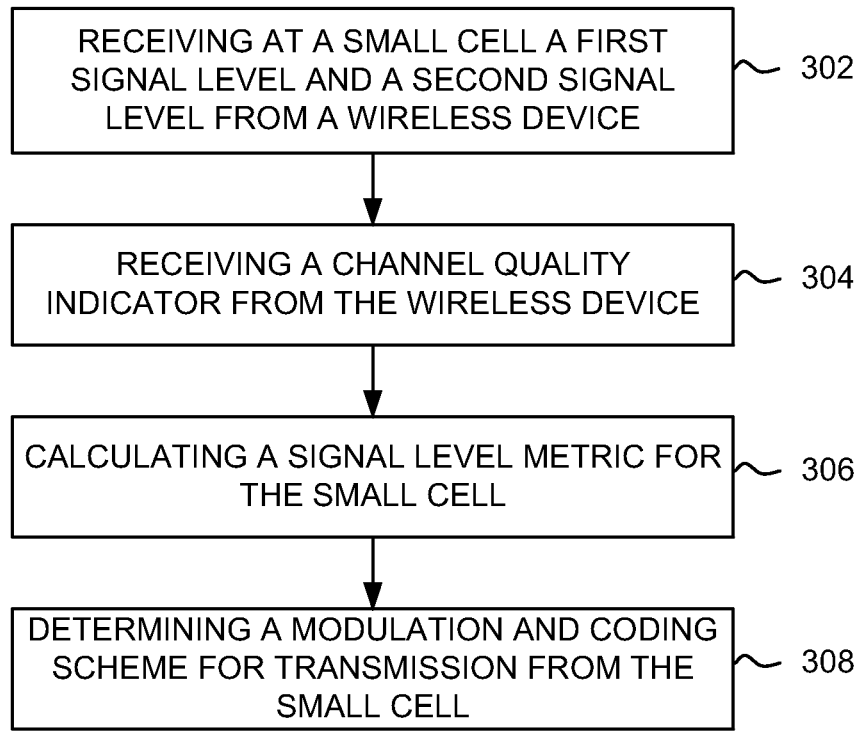
FIG. 3 illustrates an exemplary method of determining a modulation and coding scheme for a small cell.

FIG. 3 illustrates an exemplary method for determining a modulation and coding scheme for a small cell. The method will be discussed with reference to the exemplary communication system 200 illustrated in FIG. 2, however, the method can be implemented with any suitable communication system.

Referring to FIG. 3, at step 302, a small cell may receive a first signal level for a first signal received at a wireless device and a second signal level for a second signal received at the wireless device, wherein the received first signal is from the small cell and the received second signal is from a macro cell. For example, wireless device 202 may receive a first signal from small cell 206 at a first signal level and a second signal from access node 208 at a second signal level. Small cell 206 may then receive the first signal level and the second signal level from wireless device 202, for example in a measurement report from wireless device 202. In an embodiment, the first signal level and the second signal level may comprise Reference Signal Received Power (RSRP) signal levels, or any other suitable signal level.

At step 304, a channel quality indicator may be received from the wireless device that indicates a channel quality for communications between the wireless device and the small cell. For example, a channel quality indicator (CQI) may be received at small cell 206 from wireless device 202. A CQI may indicate a channel quality (e.g., wireless channel quality) for a wireless device in communication with an access point (e.g., access node or small cell). In an embodiment, the CQI may comprise a number (e.g., between 0 and 15) that provides an indication of the channel quality.

At step 306, a signal level metric for the small cell may be calculated based on the first signal level, the second signal level, and the received CQI. For example, the calculated signal level metric may comprise a predicted signal level metric for small cell 206 based on the first signal level, the second signal level, and the received CQI. In an embodiment, the calculated signal level metric may comprise a predicated signal level metric for a signal received at wireless device 202 from small cell 206 during an almost bank subframe (ABS) transmission from access node 204 (e.g., the macro cell). For example, access node 204 may implement inter-cell interference coordination (ICIC) or enhanced inter-cell interference coordination (eICIC) such that the access node transmits one or more ABS transmissions. The predicted signal level metric may comprise a predicated signal level metric for a signal received at wireless device 202 from small cell 206 during an ABS transmission from access node 204.

At step 308, a modulation and coding scheme for a transmission from the small cell may be determined based on the calculated signal level metric, wherein the transmission is associated with an almost blank subframe transmission from the macro cell. For example, a modulation and coding scheme may be determined for a transmission from small cell 206 to wireless device 202 based on the calculated signal level metric. The modulation and coding scheme may be determined for transmissions from small cell 206 to wireless device 202 associated with (e.g., during) ABS transmissions from access node 204 (e.g., the macro cell).

A modulation and coding scheme may comprise a modulation scheme (e.g., QPSK, 8QAM, 16QAM, 32QAM, 64QAM, and the like) and a coding bit rate. A bit rate may indicate a number of redundant bits in a transmission (e.g., number of redundant bits used for error correction at the receiver, and the like). Here, the combination of the modulation scheme and the bit rate may comprise a spectral efficiency for the transmission. In an embodiment, a spectral efficiency may be selected for the transmission based on the calculated signal level metric.

Figure 4:
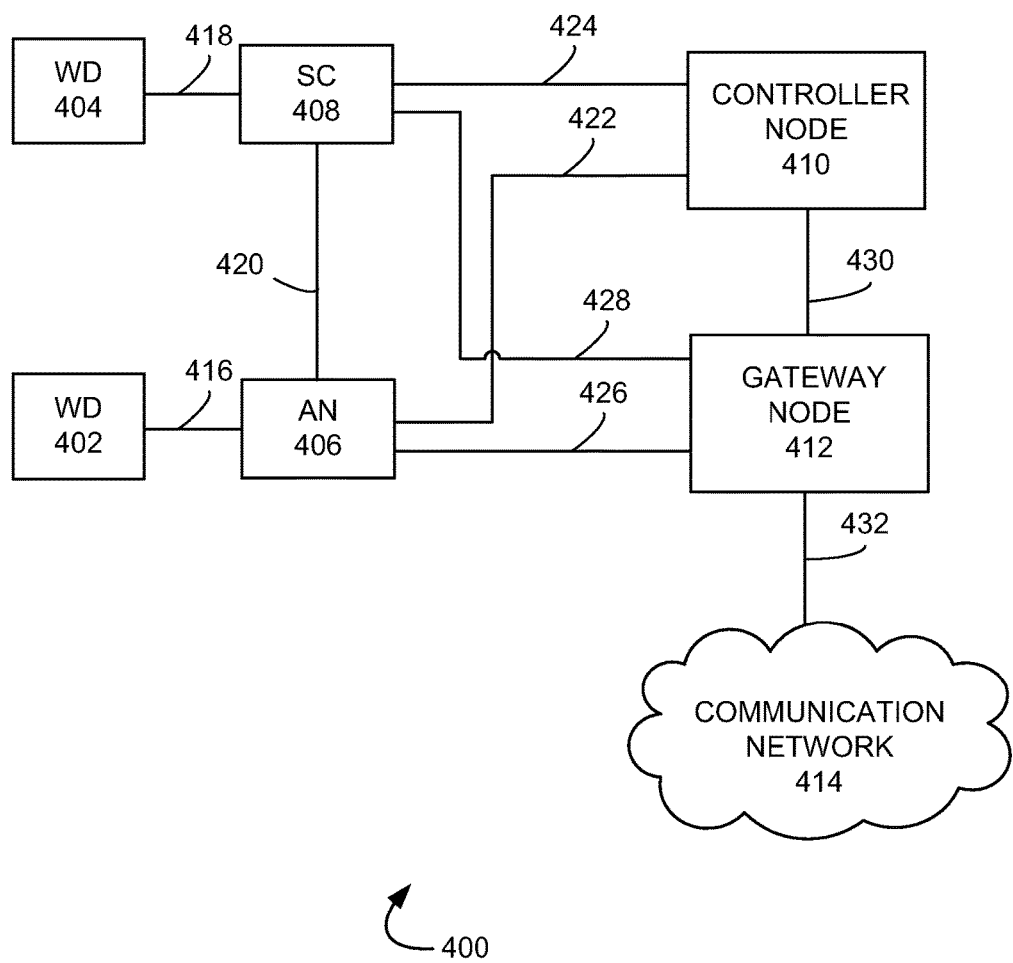
FIG. 4 illustrates another exemplary system to determine a modulation and coding scheme for a small cell.

FIG. 4 illustrates another exemplary communication system 400 to determine a modulation and coding scheme for a small cell. Communication system 400 may comprise a wireless devices 402 and 404, access node 406, small cell 408, controller node 410, gateway node 412, communication network 414, and communication links 416, 418, 420, 422, 424, 426, 428, 430, and 432. Other network elements may be present in the communication system 400 to facilitate communication but are omitted for clarity, such as base stations, base station controllers, gateways, mobile switching centers, dispatch application processors, and location registers such as a home location register or visitor location register.

Wireless devices 402 and 404 can be any device configured to communicate over communication system 400 using a wireless communication link. For example, wireless devices 402 and 404 can include a cell phone, a smart phone, a computing platform such as a laptop, palmtop, or a tablet, a personal digital assistant, or an internet access device, and combinations thereof.

Access node 406 and small cell 408 are network nodes capable of providing wireless communications to wireless devices 402 and 404. Access node 406 can be, for example, a base transceiver station, a radio base station, an eNodeB device, or an enhanced eNodeB device. In an embodiment, access node 406 may comprise a macro cell while small cell 408 may comprise a small cell (e.g., femto cell, pico cell, micro cell, or the like) such that the signal area (e.g., area around each node where a wireless device may detect wireless signals transmitted from the node at a signal level above a threshold) for the macro cell is larger than the signal area for the small cell. As such, a macro cell may transmit wireless signals with a greater signal level (e.g., use a higher transmission power) than a small cell. In an embodiment, access node 406 can comprise a serving access node for wireless device 402 and small cell 408 can comprise a serving access node for wireless device 404. Access node 406 and small cell 408 may communicate with controller node 410 over communication links 422 and 424, respectively, and with gateway node 412 over communication links 426 and 428, respectively. Access node 406 and small cell 408 may also communicate directly with each other over communication link 420.

Controller node 410 can be any network node configured to manage services within system 400. Controller node 410 may provide other control and management functions for system 400. The controller node 410 can be a single device having various functions or a plurality of devices having differing functions. For example, controller node 410 can include at least one of a multi-cell/multicast coordination entity (MCE), a mobility management entity (MME), a radio network controller (RNC), a mobile switching center (MSC), and a combination thereof.

Controller node 410 can comprise a processor and associated circuitry to execute or direct the execution of computer-readable instructions to obtain information. Controller node 410 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 410 can receive instructions and other input at a user interface. Controller node 410 can comprise a processor and associated circuitry to execute or direct the execution of computer-readable instructions to obtain information.

Gateway node 412 is a network element which can comprise a processor and associated circuitry to execute or direct the execution of computer-readable instructions. Gateway node 412 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 412 can provide instructions to access node 406 and small cell 408 related to channel selection in communications with wireless devices 402 and 404. For example, gateway node 412 can comprise at least one of a serving gateway (SGW), a packet data network gateway (PDNGW), a cellular gateway (CGW), and a combination thereof.

Communication network 414 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 414 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 414 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 416, 418, 420, 422, 424, 426, 428, 430, and 432 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 406 and small cell 408, controller node 410, gateway node 412, and communication network 414 which are omitted for clarity, including additional processing nodes, routers, gateways, and physical and/or wireless data links for carrying data among the various network elements. In an embodiment, any of controller node 410, gateway node 412, and one or more modules of access node 406 and/or small cell 408 may perform all or parts of the methods of FIGS. 3, 5, and 6.

In operation, access node 406 and small cell 408 may establish communication with wireless devices 402 and 404 respectively such that the access node and small cell provide the wireless devices access to a communication network (e.g., communication network 414). In an embodiment, system 400 may use a plurality of carriers in order to provide wireless communication services. A plurality of carriers that comprise bandwidth for wireless communications (e.g., 2.5 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, access node 406 may comprise a macro cell and small cell 408 may comprise a small cell (e.g., femto cell, pico cell, micro cell, or the like). For instance, the signal area for the macro cell may be larger than the signal area for the small cell.

In an embodiment, system 400 may leverage access node 406 and small cell 408 in order to provide wireless services over a signal area. In some examples, small cell 408 may comprise a signal area such that the small cell provides wireless services within a signal area for access node 406. Here, small cell 408 may be in communication with wireless device 404, and small cell 408 may configure transmissions from the small cell based on transmissions from access node 406. For example, small cell 408 may consider interference conditions caused by transmissions from access node 406 when determining a modulation and coding scheme. Accordingly, a system that determines a modulation and coding scheme for a small cell based on the transmissions from a macro cell may provide enhanced wireless services to users of the system.

Systems and methods are described for determining a modulation and coding scheme for a small cell. A small cell may receive a first signal level for a first signal received at a wireless device and a second signal level for a second signal received at the wireless device, wherein the received first signal is from the small cell and the received second signal is from a macro cell. The small cell may also receive a channel quality indicator from the wireless device that indicates a channel quality for communications between the wireless device and the small cell. A signal level metric may be calculated based on the first signal level, the second signal level, and the received channel quality indicator. A modulation and coding scheme for a transmission from the small call may be determined, wherein the transmission is associated with an almost blank subframe transmission from the macro cell.

Figure 5:
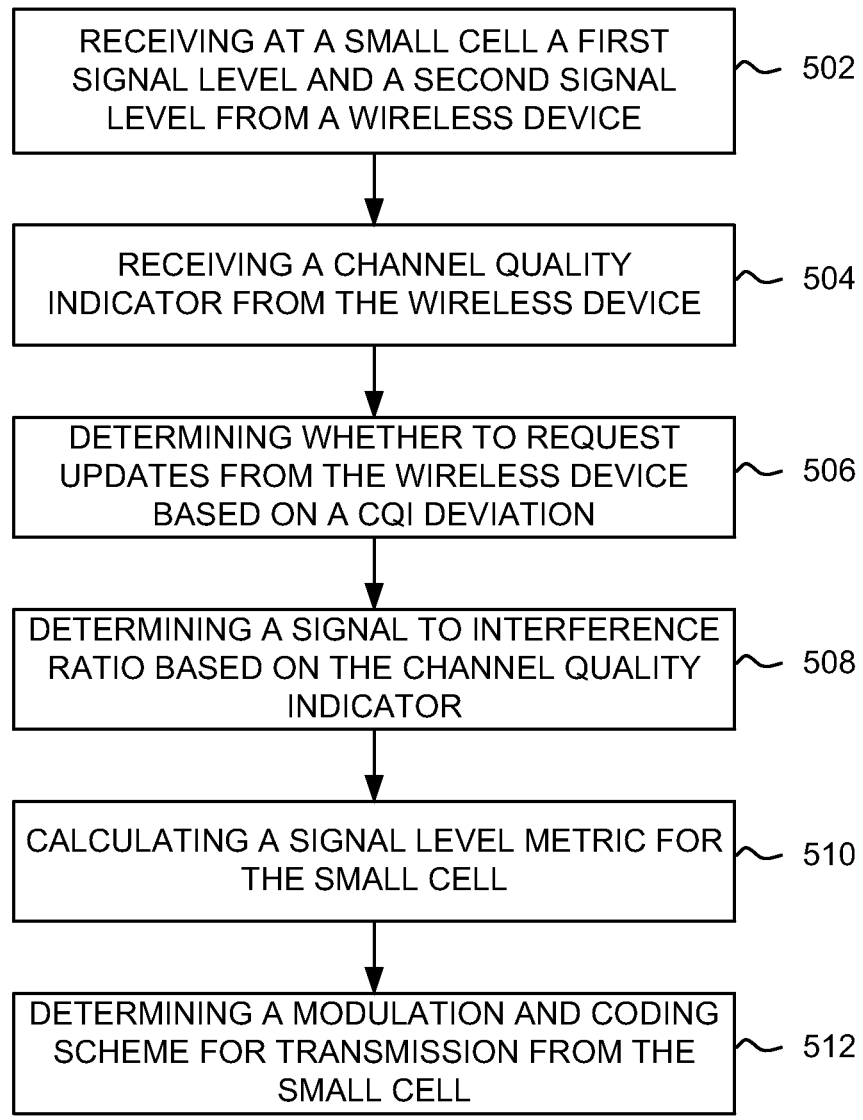
FIG. 5 illustrates another exemplary method of determining a modulation and coding scheme for a small cell.

FIG. 5 illustrates an exemplary method for determining a modulation and coding scheme for a small cell. The method will be discussed with reference to the exemplary communication system 400 illustrated in FIG. 4, however, the method can be implemented with any suitable communication system.

Referring to FIG. 5, at step 502, a small cell may receive a first signal level for a first signal received at a wireless device and a second signal level for a second signal received at the wireless device, wherein the received first signal is from the small cell and the received second signal is from a macro cell. For example, wireless device 404 may receive a first signal from small cell 408 at a first signal level and a second signal from access node 406 at a second signal level. Small cell 408 may then receive the first signal level and the second signal level from wireless device 404, for example in a measurement report. In an embodiment, the first signal level and the second signal level may comprise Reference Signal Received Power (RSRP) signal levels, or any other suitable signal level.

At step 504, a channel quality indicator may be received from the wireless device that indicates a channel quality for communications between the wireless device and the small cell. For example, a channel quality indicator (CQI) may be received at small cell 408 from wireless device 404. A CQI may indicate a channel quality (e.g., wireless channel quality) for a wireless device while communicating with an access point (e.g., small cell or access node). In an embodiment, the CQI may comprise a number (e.g., between 0 and 15) that provides an indication of the channel quality.

At step 506, it is determined whether to request an update from the wireless device based on a CQI deviation. For example, it is determined whether to request to update from wireless device 404 based on a CQI deviation. The request may comprise a request to update the first signal level and the second signal level from wireless device 404. The method of FIG. 6 further describes step 506.

At step 508, a signal to interference ratio for the wireless device based on the received channel quality indicator is determined. For example, a signal to interference plus noise ratio (SINR) is determined from the received CQI. The SINR signal level may be determined based on a mapping that associates a 4-bit CQI with a SINR level in decibels. In an example, the determined signal to interference ratio may be for small cell 408 and may be associated with a default transmission for access node 406 (e.g., a subframe transmission that does not comprise an ABS transmission). A default transmission may comprise transmission of an uplink subframe, downlink subframe, or special subframe. In an embodiment, the CQI used to determine the signal to interference ratio may comprise the new CQI (e.g., from step 506).

At step 510, a signal level metric for the small cell may be calculated based on the first signal level, the second signal level, and the determined signal to interference ratio. For example, the calculated signal level metric may comprise a predicted signal level metric for small cell 408 based on the first signal level, the second signal level, and the determined signal to interference ratio. The first signal level and second signal level used to calculate the predicted signal level metric may comprise the updated first signal level and updated second signal level from step 506.

In an embodiment, the calculated signal level metric may comprise a predicated signal level metric for a signal received at wireless device 404 from small cell 408 during an almost bank subframe (ABS) transmission from access node 404 (e.g., the macro cell). For example, access node 406 and small cell 408 may implement inter-cell interference coordination (ICIC) or enhanced inter-cell interference coordination (eICIC) such that the access node transmits one or more ABS transmissions. Access node 404 may comprise a frame structure that comprises, uplink, downlink, and special subframes, and may also comprise one or more ABS transmissions in the frame structure. The ABS transmission may be leveraged by system 400 such that communication with small cell 408 may experience reduced interference during the ABS transmission from access node 406. For example, small cell 408 may experience interference conditions when access node 406 transmits default subframes (e.g., uplink, downlink, or special subframes). An ABS transmission from access node 406 may comprise a subframe that is blank, or almost blank, and thus reduces the interference experienced by small cell 408.

In an example, the first signal level, the second signal level, and the determined signal to interference ratio may be associated with default transmissions from access node 406. For instance, the first signal level, the second signal level, and the signal to interference ratio may be associated with channel conditions (e.g., interference conditions) during default transmissions from access node 406 (e.g., transmission of uplink, downlink, or special subframes, not an ABS transmission). The predicted signal level metric may comprise a predicated signal level metric for a signal received at wireless device 404 from small cell 408 during an ABS transmission from access node 406. In an embodiment, the predicted signal level metric may comprise a predicted signal to interference ratio (e.g., SINR) level for a signal received at wireless device 404 from small cell 408 during an ABS transmission from access node 406.

The predicted signal level metric may be based on the following equation:

$$SIR_{ABS} = W \times \frac{P_{small\,cell}}{\frac{P_{small\,cell}}{SIR_{Default}} - P_{macro}}$$

In the above, $SIR_{ABS}$ may comprise the predicted signal to interference ratio (e.g., SINR) for a signal received at a wireless device (e.g., wireless device 404) from a small cell (e.g., small cell 408) associated with an ABS transmission from a macro cell (e.g., access node 406). $P_{small\,cell}$ may comprise the first signal level (e.g., RSRP) received from the small cell at the wireless device. $P_{macro}$ may comprise the second signal level (e.g., RSRP) received from the macro cell at the wireless device. $SIR_{Default}$ may comprise the determined signal to interference ratio (e.g., determined based on the CQI received from the wireless device at the small cell) associated with a default transmission from the macro cell (e.g., non-ABS subframe transmission).

In an embodiment, W may comprise a weighing factor based on the ratio of ABS to default subframes in a frame structure for the macro cell. For example, the frame structure for the macro cell (e.g., access node 406) may comprise one or more ABS transmissions and a number of default subframe transmissions (e.g., uplink, downlink, special, and the like). W may comprise the ratio of ABS transmissions to default subframe transmissions from the macro cell.

At step 512, a modulation and coding scheme for a transmission from the small cell may be determined based on the calculated signal level metric, wherein the transmission is associated with an almost blank subframe transmission from the macro cell. For example, a modulation and coding scheme may be determined for a transmission from small cell 408 to wireless device 404 based on the calculated signal level metric. The modulation and coding scheme may be determined for transmissions from small cell 408 to wireless device 404 associated with (e.g., during) ABS transmissions from access node 406 (e.g., the macro cell).

In an embodiment, a frame structure for access node 406 may comprise one or more ABS transmissions. The determined modulation and coding scheme may be for subframe transmissions from small cell 408 during the transmission time interval (TTI) of an ABS transmission from access node 406. In an embodiment, access node 406 and small cell 408 may implement ICIC or eICIC such that small cell 408 may transmit a subframe with the determined modulation and coding scheme during the same TTI as access node 406 transmits an ABS.

A modulation and coding scheme may comprise a modulation scheme (e.g., QPSK, 8QAM, 16QAM, 32QAM, 64QAM, and the like) and a coding bit rate. A bit rate may indicate a number of redundant bits in a transmission (e.g., number of redundant bits used for error correction at the receiver, and the like). Here, the combination of the modulation scheme and the bit rate may comprise a spectral efficiency for the transmission. In an embodiment, a spectral efficiency may be selected for the transmission based on the calculated signal level metric. In an example, the calculated signal level metric may comprise a predicted signal to interference level from wireless device 404.

Figure 6:
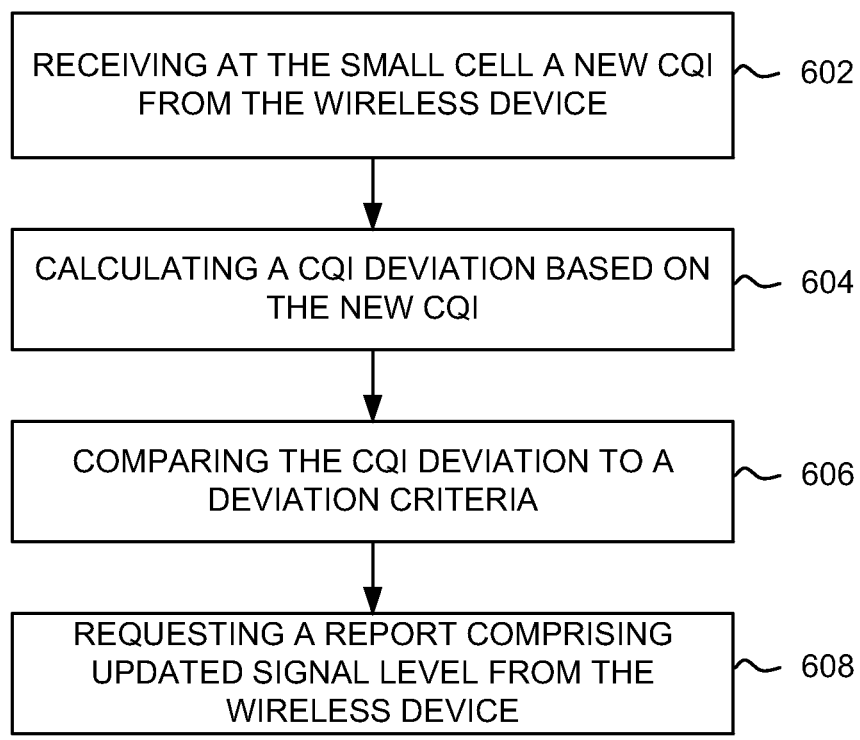
FIG. 6 illustrates another exemplary method of determining whether to request updated signal information for a wireless device.

FIG. 6 illustrates an exemplary method for determining whether to request updated signal information for a wireless device. The step 506 of FIG. 5 may further comprise the steps of FIG. 6. The method will be discussed with reference to the exemplary communication system 400 illustrated in FIG. 4, however, the method can be implemented with any suitable communication system.

At step 602, a new CQI may be received at the small cell from the wireless device. For example, at step 504 of FIG. 5, a CQI may be received at small cell 408 from wireless device 404 at a first time. A new CQI may then be received at small cell 408 from wireless device 404 at a second time, where the second time may be after the first time. The new CQI may comprise an indication of the channel quality for communication between wireless device 404 and small cell 408 at the second time.

At step 604, a CQI deviation may be calculated based on the previously received CQI and the new CQI. For example, a CQI deviation may be calculated based on the CQI received at the first time (e.g., the previously received CQI from step 504 of FIG. 5) and the CQI received at the second time (e.g., the new CQI from step 602). The CQI deviation may comprise the difference between the previously received CQI and the new CQI.

At step 606, the CQI deviation may be compared to a deviation criteria. For example, the CQI deviation may be compared to a deviation threshold (e.g., a minimum difference in CQI). The deviation criteria may be based on a block error rate (BLER) for communication between wireless device 404 and small cell 408. In an example, an increase in the BLER may correspond to a decrease in the deviation criteria (e.g., a decrease in the deviation threshold).

At step 608, a report may be requested from the wireless device comprising updated first and second signal levels when the CQI deviation meets the criteria. For example, a report may be requested from wireless device 404 comprising an updated first signal level (e.g., the received signal level at wireless device 404 for a signal transmitted from small cell 608, such as RSRP) and an updated second signal level (e.g., the received signal level at wireless device 404 for a signal transmitted from access node 606, such as RSRP) when the CQI deviation meets the deviation threshold. In this example, the CQI deviation meeting the deviation criteria may indicate that wireless conditions have changed for wireless device 404. Accordingly, updated first and second signal levels may be requested from wireless device 404 such that the signal levels used to calculated a signal level metric for the small cell (e.g., at step 510) may be based on signal levels that reflect current channel conditions.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 7:
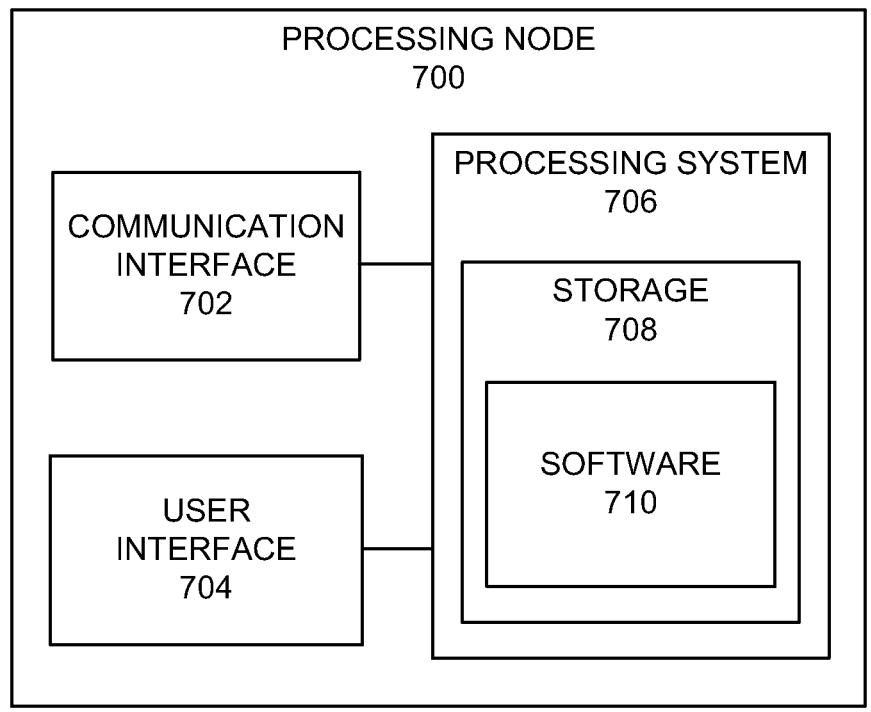
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to determine a communication access node for a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include controller node 410 and gateway node 412. Processing node 700 can also be an adjunct or component of a network element, such as an element of access nodes 106 or 406, small cell 108 or 408, and the like. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for determining a modulation and coding scheme for a small cell, the method comprising:
   receiving, at a small cell from a wireless device, a first signal level for a first signal received at the wireless device and a second signal level for a second signal received at the wireless device, wherein the received first signal is from the small cell and the received second signal is from a macro cell;
   receiving a channel quality indicator from the wireless device that indicates a channel quality for communications between the wireless device and the small cell;
   calculating a predicted signal level metric for a signal received at the wireless device from the small cell during an almost blank subframe transmission from the macro cell based on the first signal level, the second signal level, and the received channel quality indicator; and
   determining a modulation and coding scheme for a transmission from the small cell based on the calculated signal level metric, wherein the transmission is associated with an almost blank subframe transmission from the macro cell.

2. The method of claim 1, further comprising:
determining a signal to interference ratio for the wireless device based on the received channel quality indicator; and
calculating the predicted signal level metric based on the first signal level, the second signal level, and the determined signal to interference ratio.

3. The method of claim 2, further comprising:
calculating the predicted signal level metric based on the first signal level, the second signal level, the determined signal to interference ratio, and a weighing factor associated with an almost blank subframe transmission from the macro cell.

4. The method of claim 2, wherein the weighing factor is based on a ratio of a number of almost blank subframe transmissions and a number of default subframe transmissions from the macro cell.

5. The method of claim 2, wherein the first signal level and second signal level comprise reference signal received power levels.

6. The method of claim 5, wherein the predicted signal level metric comprises a predicted signal to interference ratio.

7. The method of claim 1, further comprising:
receiving a new channel quality indicator form the wireless device that indicates a channel quality for communications between the wireless device and the small cell;
calculating a channel quality indicator deviation based on the previously received channel quality indicator and the new channel quality indicator; and
requesting a report from the wireless device comprising an update for the first signal level and an update for the second signal level based on the channel quality indicator deviation.

8. The method of claim 7, wherein the report comprising the update for the first signal level and the update for the second signal level is requested when the channel quality indicator deviation meets a deviation criteria.

9. The method of claim 8, wherein the deviation criteria is based on a block error rate for the wireless device.

10. A system for determining a modulation and coding scheme for a small cell, the system comprising:
a processing node with a processor configured to:
receive, at a small cell from a wireless device, a first signal level for a first signal received at the wireless device and a second signal level for a second signal received at the wireless device, wherein the received first signal is from the small cell and the received second signal is from a macro cell;
receive a channel quality indicator from the wireless device that indicates a channel quality for communications between the wireless device and the small cell;
calculate a predicted signal level metric for a signal received at the wireless device from the small cell during an almost blank subframe transmission from the macro cell based on the first signal level, the second signal level, and the received channel quality indicator; and
determine a modulation and coding scheme for a transmission from the small cell based on the calculated signal level metric, wherein the transmission is associated with an almost blank subframe transmission from the macro cell.

11. The system of claim 10, wherein the processing node is further configured to:
determine a signal to interference ratio for the wireless device based on the received channel quality indicator; and
calculate the predicted signal level metric based on the first signal level, the second signal level, and the determined signal to interference ratio.

12. The system of claim 11, wherein the processing node is further configured to:
calculate the predicted signal level metric based on the first signal level, the second signal level, the determined signal to interference ratio, and a weighing factor associated with an almost blank subframe transmission from the macro cell.

13. The system of claim 11, wherein the weighing factor is based on a ratio of a number of almost blank subframe transmissions and a number of default subframe transmissions from the macro cell.

14. The system of claim 11, wherein the first signal level and second signal level comprise reference signal received power levels.

15. The system of claim 14, wherein the predicted signal level metric comprises a predicted signal to interference ratio.

16. The system of claim 10, wherein the processing node is further configured to:
receive a new channel quality indicator form the wireless device that indicates a channel quality for communications between the wireless device and the small cell;
calculate a channel quality indicator deviation based on the previously received channel quality indicator and the new channel quality indicator; and
request a report from the wireless device comprising an update for the first signal level and an update for the second signal level based on the channel quality indicator deviation.

17. The system of claim 16, wherein the report comprising the update for the first signal level and the update for the second signal level is requested when the channel quality indicator deviation meets a deviation criteria.

18. The system of claim 17, wherein the deviation criteria is based on a block error rate for the wireless device.

19. The method of claim 1, wherein the first signal level and the second signal level are associated with a transmission from the macro cell that does not comprise an almost blank subframe transmission.

20. The system of claim 10, wherein the first signal level and the second signal level are associated with a transmission from the macro cell that does not comprise an almost blank subframe transmission.

* * * * *